L. WOLFF.
Distilling Apparatus.
No. 101,555.          Patented April 5, 1870.
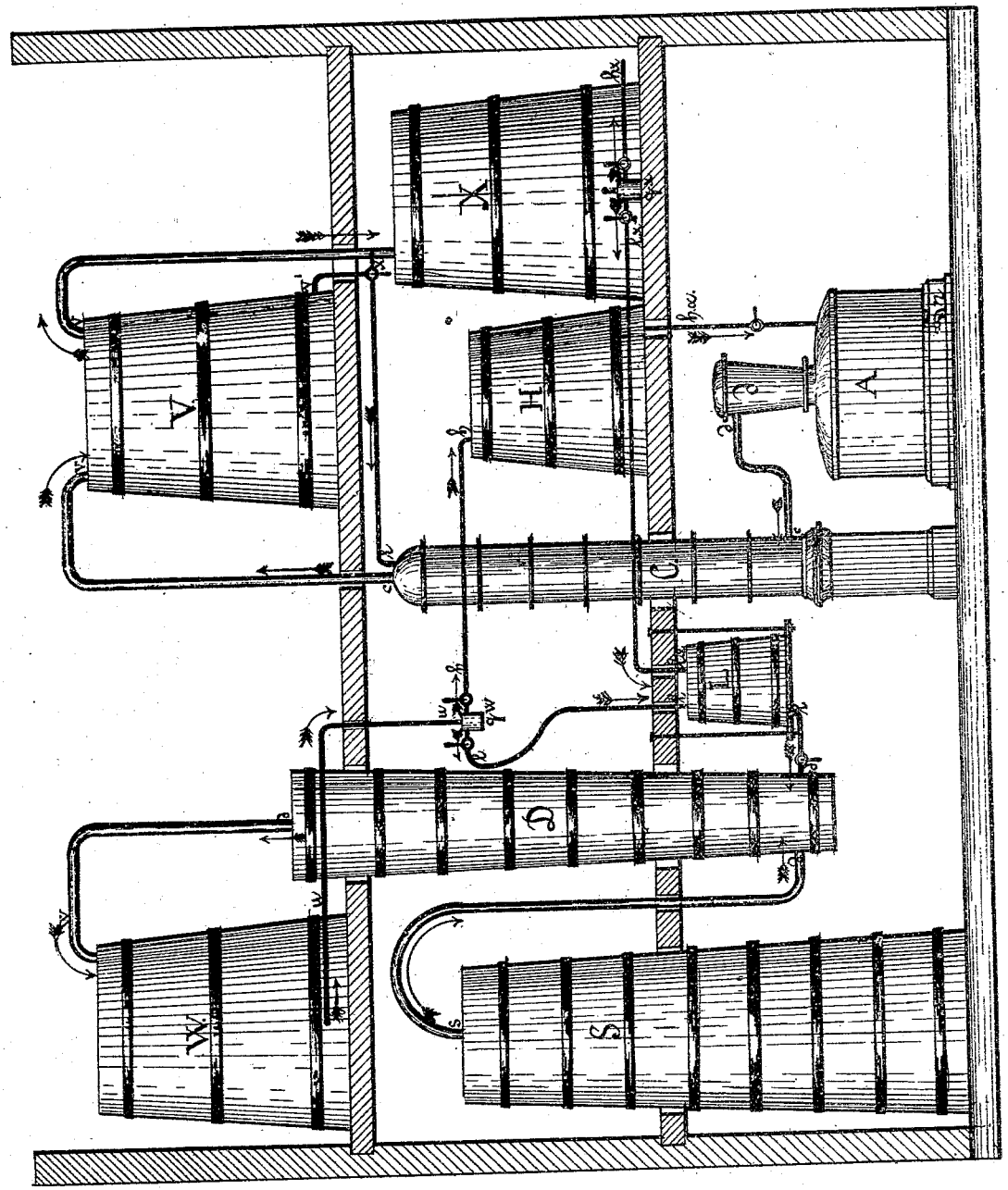

United States Patent Office.

LUDWIG WOLFF, OF CHICAGO, ILLINOIS, ASSIGNOR TO HIMSELF, DAVID G. RUSH H. J. PAHLMAN, AND CHARLES WELSH, OF SAME PLACE.

Letters Patent No. 101,555, dated April 5, 1870.

IMPROVED COMBINATION DISTILLING APPARATUS.

The Schedule referred to in these Letters Patent and making part of the same

*To all whom it may concern:*

Be it known that I, LUDWIG WOLFF, of Chicago, in the county of Cook and State of Illinois, have invented a Duplex Combination Distilling Apparatus; and I do hereby declare that the following is a full and exact description thereof, which will enable those skilled in the art to make and use the same, reference being had to the accompanying drawings and letters marked thereon, making a part of this specification, in which—

Figure 1 is a longitudinal elevation of my duplex combination distilling apparatus.

This invention relates to a combined distilling apparatus, arranged in such a manner that alcohol may be manufactured directly from fermented mash, wort, &c., by a single continuous operation.

From the commencement until the completion of the operations, the alcoholic vapors and liquids are confined in continuous closed pipes and vessels, securely constructed.

By this combination, the loss by evaporation is very small and inconsiderable compared with the usual method of distilling, and no abduction of wines or alcohol can be effected by employés or others without disarranging or breaking the secure continuous connections of the apparatus.

No labor will be required to handle the wines during the entire process of manufacture, the combination being so arranged that the vapors rise automatically, and the liquids descend by their own gravity, making the working of the entire apparatus almost automatic, so that one person can operate it.

In the accompanying drawing—

S is a hollow vessel, constructed of metal, or part metal and wood, and into which the fermented mash or wort is put, and in which the process of distillation, with a view of obtaining nearly absolute alcohol, commences by introducing hot steam-vapor, derived from any ordinary steam-boiler in the usual manner.

The temperature of the still being raised to the boiling point, the vapor generated therein will rise and pass through the pipe *s d* into D, the doubler, which is a hollow vessel, made of metal, or metal and wood jointly, and in which the alcoholic vapor is concentrated, and from which it is conducted through a pipe, *d w*, into W the worm-tub, which is a hollow vessel, containing a metallic coil-pipe, known as a worm.

This vessel is filled with cold water, and it has a stream constantly flowing into it. This vapor, passing through the worm surrounded by cold water, becomes condensed, and escapes from the worm-tub W in a liquid form, through the pipe *u u* leading to *q w*, which is a small inclosed vessel, commonly known as a separator. In the bottom part of this separator a small portion of the liquid product conveyed into it through the pipe *u u* remains constantly, and in which an ordinary floating hydrometer is placed to indicate the specific gravity of the liquid therein.

There are two pipes connected with the separator. Pipe *l l* connects it with L, the low-wine tub, and it is provided with a stop-cock, placed close by the separator *q w*.

This communication is required only for a short time, and at the commencement of each charge in the vessel or still S. But when the temperature is properly distributed through the still S and doubler D, the hydrometer in the separator *q w* will indicate a liquid of lower specific gravity, and of greater alcoholic strength.

The stop-cock placed in pipe *l l* is now closed, and the stop-cock placed in the pipe *h h* is opened, and the liquid alcoholic product is conveyed into H, a hollow closed metallic or wooden vessel, and called a charger. This charger being full of crude wines, the stop-cock in pipe *h a* is opened, and the boiler A filled, when this stop-cock is again closed.

A is a copper boiler, having an ordinary steam coil pipe at the bottom, which is connected with and heated by any ordinary steam-boiler.

The crude wines, becoming vaporized in the boiler A, will rise into *d*, a vapor dome, and thus pass through pipe *d c* into C, which is an ordinary alcohol column, with the usual appurtenances supplied, the vapor continuing to ascend in the column C, and passes through pipes *c' v* into the goose-tub V, containing an ordinary metallic pipe called a goose.

This tub is filled with water of a regulated temperature below the boiling point, and maintained by a constant supply of cold water. In the goose a partial condensation of the vapor passing into it is effected, water and oleaginous impurities being condensed pass out of the goose-tub through the pipe *v' l'*, back into the alcohol column C.

The pipe *v' l'*, at the bottom of the goose-tub V, is guarded by a stop-cock capable of directing the flow either to the right or left, and be caused to open a communication with pipe *v x*, a worm-pipe, and tub X. Fusil-oil will pass from *r* to *x* into the worm-pipe and tub X.

The alcoholic vapor will rise out of the goose-tub V in the pipe *v x*, leading to worm-tub X, said pipe *v x* being coiled in the tub X constitutes a worm. This tub is full of cold water, a stream flowing constantly into it.

In this worm the alcohol is cooled and condensed, and it escapes through a pipe at the bottom of the tub into *q x*, a separator, in which may be placed a hydrometer to indicate the specific gravity and proof of the alcohol flowing into it.

Alcohol of ninety-four per cent. proof now having been made, is conveyed in a pipe, *h x*, to an ordinary receiver or cistern.

At the commencement of the distillation the product flowing into $qx$ will not be pure alcohol, and the proof will be below the above standard, the stop-cock on the left of the separator $qx$ will be opened, and the low wines be conveyed back through pipe $lx$ into the low-wine tub; but when the hydrometer indicates the proper degree of proof, this communication is closed, and the alcohol conveyed as above described, by opening the stop-cock to the right of the aforesaid separator.

The low-wine tub L is an inclosed vessel receiving all the low wines resulting from this double distillation. These low wines are from time to time conducted through pipe $ld$, by opening a stop-cock into D the doubler, in which the alcoholic principles thereof will be revaporized and converted into alcohol, as hereinbefore described.

After continuous operations, a residuum of water and impurities will collect in the boiler A, after the alcohol has been distilled therefrom, and which must from time to time be discharged through this pipe and cock $n$.

This stop-cock $n$ is seldom opened, and to guard the entire closure of the whole apparatus, it is fastened by a lock, the key being in the hands of a trusted person.

What I claim, and desire to secure by Letters Patent of the United States, is—

The still S, pipe $sd$, doubler D, pipe $dw$, and the worm-pipe and tub W, in combination with pipe $uu$, low-wine tub L, pipes $ld$ and $hh$, alcohol column C, the charger H, pipe $cv$, goose-tub V, pipes $vx$ and $v'c'$, the worm-tub X, pipes $hx$ and $lx$ and $ha$, boiler A, and pipe $dc$, discharge-pipe and stop-cock $n$, for manufacturing alcohol from mash or wort, &c., in the still S by one continuous operation, substantially as and for the purpose set forth, with or without the separators $qw$ and $qx$.

LUDWIG WOLFF.

Witnesses:
G. L. CHAPIN,
D. G. RUSH.